United States Patent
Scheussler et al.

(10) Patent No.: US 6,366,950 B1
(45) Date of Patent: Apr. 2, 2002

(54) SYSTEM AND METHOD FOR VERIFYING USERS' IDENTITY IN A NETWORK USING E-MAIL COMMUNICATION

(75) Inventors: Robert W. Scheussler, Yorba Linda; David P. Sperling, Laguna Niguel, both of CA (US)

(73) Assignee: Smithmicro Software, Aliso Viejo, CA (US)

(*) Notice: Subject to any disclaimer, the term of this patent is extended or adjusted under 35 U.S.C. 154(b) by 0 days.

(21) Appl. No.: 09/285,309

(22) Filed: Apr. 2, 1999

(51) Int. Cl.[7] .............................................. G06F 15/16
(52) U.S. Cl. ...................................... 709/206; 709/207
(58) Field of Search ................................. 709/206, 207

(56) References Cited

U.S. PATENT DOCUMENTS

| | | | |
|---|---|---|---|
| 4,994,926 A | | 2/1991 | Gordon et al. |
| 5,291,302 A | | 3/1994 | Gordon et al. |
| 5,459,584 A | | 10/1995 | Gordon et al. |
| 5,838,790 A | * | 11/1998 | McAuliffe et al. ............. 380/4 |
| 5,937,160 A | * | 8/1999 | Davis et al. ................... 707/10 |
| 6,021,427 A | * | 2/2000 | Spagna et al. ............... 709/206 |
| 6,085,321 A | * | 7/2000 | Gibbs et al. ................. 713/170 |

FOREIGN PATENT DOCUMENTS

WO    WO 97/36239    2/1997

OTHER PUBLICATIONS

Article; The Associated Press; The Orange County Register Newspaper, CA; News Section; "Privacy Groups Plan Boycott to Protest Intel Chip"; Jan. 25, 1999; p. 6.

Article; The Associated Press; The Orange County Register Newspaper, CA; Orange County/State Section; "Intel Bows to Privacy Demands"; Jan. 26, 1999; page unknown.

L. Elteto; "Whitepaper; iGuard Secured Agents", (http://www.rainbow.com/iguard/i-Guard_wp.html) Rainbow Technologies, Inc., 11 pages, Mar. 31, 1999.

iGuard, "Benefits" (http://www.rainbow.com/iguard/benefits.html), 1 page, Mar. 31, 1999.

iGuard, "What is iGuard?" (http://www.rainbow.com/iguard/index.html), 2 pages, Mar. 31, 1999.

iGuard, "Frequently Asked Questions" (http://www.rainbow.com/iguard/iGuard_FAQs.html), 3 pages, Mar. 31, 1999.

Client Guide; Hot Fax Share, Network Faxing Made Easy; SmithMicro Software, Inc.; 1998; 63 pages.

Server Guide; Hot Fax Share, Network Faxing Made Easy; SmithMicro Software, Inc.; 1998; 54 pages.

* cited by examiner

*Primary Examiner*—Saleh Najjar
(74) *Attorney, Agent, or Firm*—Knobbe, Martens, Olson & Bear LLP (57) ABSTRACT

A communications network includes several computers connected to a communications medium. In one embodiment, a client computer has a unique identification number that is embedded within a processor. The client computer includes a client module which generates a message that includes the identification number and sends the message over the communications medium. Another computer receives the message and retrieves the identification number from the message. In addition, the computer processes the identification number and updates an identification database. The processing of the identification number and the updating of the identification database is triggered when the message is received.

11 Claims, 7 Drawing Sheets

SYSTEM AND METHOD FOR VERIFYING USERS' IDENTITY IN A NETWORK USING E-MAIL COMMUNICATION

BACKGROUND OF THE INVENTION

1. Field of the Invention

The invention generally relates to computer networks. More particularly, the invention relates to a system and method for identifying users in a distributed network.

2. Background

An example of a basic computer network includes two computers that are interconnected. A more sophisticated computer network includes a multiplicity of computers that form a distributed computer network such as the Internet.

The Internet is a global network of computers. The structure of the Internet is a network backbone with networks branching from the backbone. These branches, in turn, have networks branching from them, and so on. Routers move information packets from network to network, until the information packets reach their destination. For a more detailed description of the structure and operation of the Internet, please refer to "The Internet Complete Reference," by Harley Hahn and Rick Stout, published by McGraw-Hill, 1994.

One popular part of the Internet is the World Wide Web. The World Wide Web contains computers that display graphical and textual information. Computers that provide information on the World Wide Web are typically called "websites." A website is defined by an Internet address that has an associated electronic page, often called a "home page." Generally, a home page is an electronic document that organizes the presentation of text, graphical images, audio and video into a desired display. These websites are operated by a wide variety of entities that are typically called "content providers."

A user may access the Internet using a home personal computer (PC) equipped with a conventional modem. Special interface software is installed within the PC so that when the user wishes to access the Internet, an attached modem is automatically instructed to dial the telephone number associated with the local Internet host server. The user can then access information at any address accessible over the Internet. Two well-known software interfaces, for example, are the Netscape Navigator developed by Netscape, Inc. and the Microsoft Internet Explorer developed by Microsoft Corporation.

Information exchanged over the Internet is typically encoded in HyperText Mark-up Language (HTML) format. The HTML format is a scripting language that is used to generate the home pages for different content providers. In this setting, a content provider is an individual or company that places information (content) on the Internet so that it can be accessed by others. As is well known in the art, the HTML format is a set of conventions for marking different portions of a document so that each portion appears in a distinctive format. For example, the HTML format identifies or "tags" portions of a document to identify different categories of text (e.g., the title, header, body text, etc.). When a web browser accesses an HTML document, the web browser reads the embedded tags in the document so it appears formatted in the specified manner.

The structure of the Internet as such and the easy access to it are reasons why the Internet is considered to be an "untrusted" network. In view of the amount of transactions that occur over the Internet, secured transactions are of great importance. In addition, the parties involved in a transaction should be able to rely on the identity of the other party with whom personal and confidential data is exchanged.

Common methods of securing transactions and authentizising/identifying users occur via passwords and/or account numbers. This authentication information is in most cases coupled with personal user data such as credit card number, billing address, phone number, etc. While transmitted over the Internet, this information is exposed to a large number of users who may fraudulently intercept the information.

In addition to these security concerns, a further concern is that users can camouflage their real identity, for example, by regularly changing the screen name and/or their return address in an electronic mail message (email).

SUMMARY OF THE INVENTION

The present invention provides a system and a method of identifying computer users. In one embodiment, a communications network includes several computers connected to a communications medium. A client computer includes an identification module that provides a unique identification number. In the following description, a module includes, but is not limited to, software or hardware components that perform certain tasks. Thus, a module may include object-oriented software components, class components, methods, functions, attributes, procedures, subroutines, segments of program code, drivers, firmware, microcode, circuitry, data, data structures, tables, arrays, variables, etc. For example, the identification number can be implemented in the computer's central processor or in read only memory, a smart card, etc. In one embodiment, the identification number is embedded within with a processor.

The client computer includes a client module that generates a message that includes the identification number and sends the message over the communications medium. Another computer receives the message and retrieves the identification number from the message. The computer also updates an identification database. The processing of the identification number and the updating of the identification database is triggered when the message is received.

An aspect of the invention involves a method of maintaining a user identification database that indicates when users are in communication with a network. The method includes the acts of associating in a computer accessible storage medium, electronic mail addresses, processor-embedded identifiers and status information. A first electronic message is received from a first computer. The first electronic message contains an electronic mail address and a copy of the processor-embedded identifier existing in the first computer. The first electronic mail address is used to access the corresponding processor-embedded identifier stored in the storage medium. The processor-embedded identifier from the first computer is compared with the processor-embedded identifiers of the storage medium. The status information in the storage medium is modified to indicate that the first electronic mail address is authentic when the processor-embedded identifier from the first computer matches a processor-embedded identifier of storage medium.

Another aspect of the invention involves a method of establishing a conferencing connection. A first processor-specific identifier embedded within a first computer is received by a second computer a when the first computer is in communication with a communications medium. A second processor-specific identifier embedded within the second computer is received by the first computer when the second computer is in communication with the communications medium. The first computer provides an indication that the second computer is in communication with the communications medium in responds to a request from the first computer to initiate a conferencing connection with the second computer.

A further aspect of the invention involves a method of identifying computer users by using processor-specific identifiers. The method includes the acts of receiving a first processor-specific identifier that is embedded within a computer processor, accessing a database that associates processor-specific identifiers with information about users of computer processors; and obtaining the information of a computer processor user that corresponds to the first processor-specific identifier.

Another aspect of the invention involves a method of identifying users by using manufacturer-embedded identifiers. The method includes the acts of associating a database of manufacturer-embedded identifiers with information about users, wherein each manufacturer-embedded identifier is associated with information about a user; and-using the manufacturer-embedded identifier to access the user information that corresponds to the manufacturer-embedded identifier.

A still further aspect of the invention involves a method of monitoring when a processor accesses a communications medium by using a processor-specific identifiers that is embedded within the processor. The method includes the acts of receiving from a first processor a processor-specific identifier embedded therein when the first processor is in communication with a communications medium; and updating a database to indicate that the first processor is in communication with the communications medium.

A further aspect of the invention involves a computer system including first and second computers. The first computer is connectable to a communications medium and comprises an identification module that provides a computer-specific identification number. The first computer encloses the identification number to a message for sending over the communications medium. The second computer is connectable to the communications medium to receive the message and to retrieve the identification number from the message. The second computer comprises a database configured to process the identification number of the first computer to identify the first computer.

A further aspect of the invention involves a communications network that includes first and second computers and a server computer. The first computer is connectable to a communications medium and comprises a first identification module that provides a first identification number. The first computer generates a first message including the first identification number for sending over the communications medium. The second computer is connectable to the communications medium. The computer server is connectable to the communications medium and comprises an identification database. The computer server receives the first message and retrieves the first identification number from the first message. The computer server further processes the first identification and to update the identification database.

An additional aspect of the invention involves a computer that includes a communications module configured to receive and send electronic messages; and a database. The database stores electronic message addresses and corresponding processor-specific identifiers. The database is configured to be updated through a first electronic message containing a first electronic message address and a first processor-specific identifier.

For purposes of summarizing the invention, certain aspects, advantages and novel features of the invention have been described herein. Of course, it is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These and other features and advantages of the invention become more apparent upon reading the following detailed description and upon reference to the accompanying drawings.

DETAILED DESCRIPTION OF THE PREFERRED EMBODIMENTS

Figure 1:
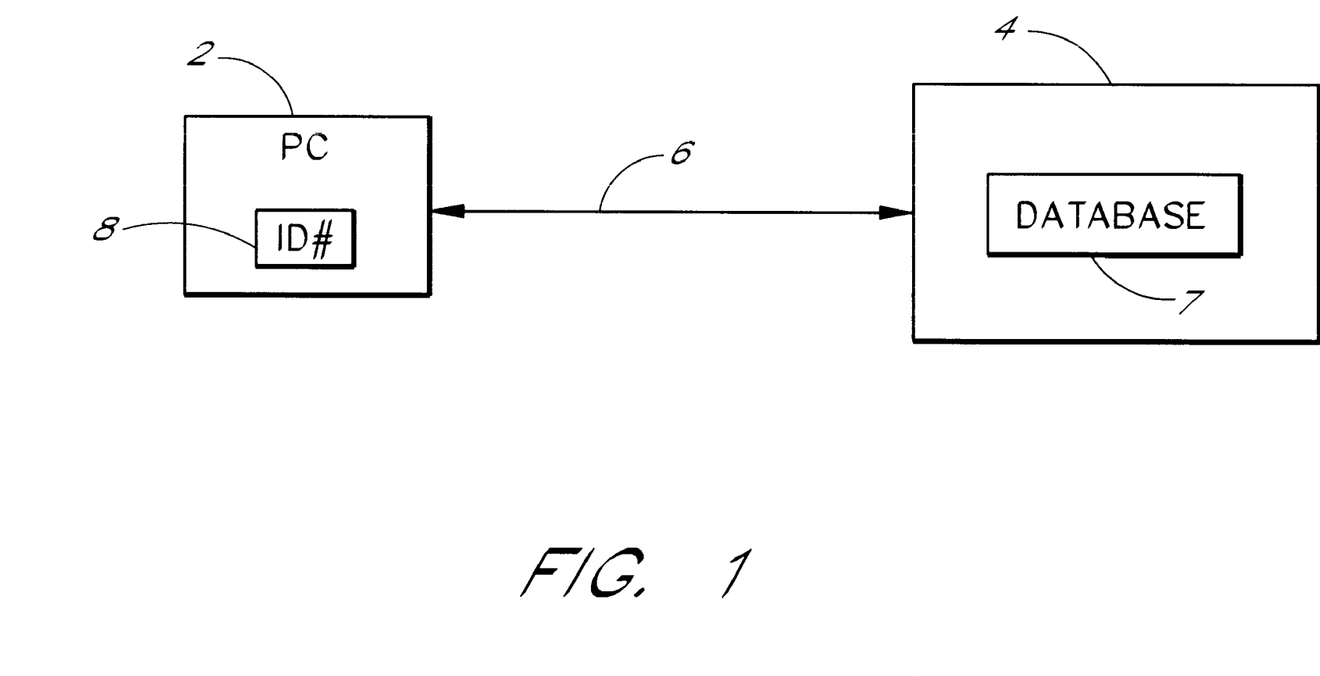
FIG. 1 shows a block diagram of one embodiment of a computer network.

FIG. 1 shows a block diagram of one embodiment of a computer network. The computer network includes two computers 2, 4 that communicate with each other by use of a communications medium 6. In one embodiment, each computer 2, 4 is in the domain of a different user. The communications medium 6 can be, for example, an individual coaxial cable or an individual telephone line, however, a wide range of communications media can be used. For instance, the communications medium 6 can be part of a telephone network, a cable television network, a wireless data transmission system, a customized computer network, and the like typically used in the field of data communications.

Both computers 2, 4 can be conventional computers each running an appropriate operating system such as, but not limited to, Microsoft Windows 3.1, Microsoft Windows 95 or Windows 98, Microsoft Windows NT, the Apple MacOS, UNIX, LINUX, or the like. As is conventional, the computers 2, 4 have appropriate hardware such as microprocessors, memory devices and communications devices. The microprocessors are in one embodiment Pentium III processors available from Intel Corporation. The communications devices are typically modems or network interface devices that handle incoming and outgoing message traffic passed over the communication medium 6.

The computer 2 includes an identification module 8 that provides a unique identification number or serial number for the microprocessor. In one embodiment, the identification module 8 is implemented within the microprocessor. The identification number, hereinafter referred to as the ID number, is permanently stored within the microprocessor and, thus, secured against unauthorized manipulation.

In another embodiment, the identification module 8 can be embedded in a separate hardware or software component.

The components are closely associated with the microprocessor within the computer 2 so that the microprocessor can read the ID number from the components. For instance, the component can be implemented on an add-on board that the user can plug into the computer 2 to up-grade the computer 2. Generally, however, the component can be implemented with a hard disk, a ROM, a non-volatile memory, a smart card, a diskette, a compact disk, and an electrically erasable programmable ROM (EEPROM). The smart card stores an ID number that is unique for a specific user. The user can then use different computers and always have the same ID number.

As described below in greater detail, the computer 4 includes a database 7 that is stored in a computer accessible storage medium. The database 7 stores the ID number of the computer 2. The ID number can be input, through the user of the computer 4, or through a registration procedure when the computer 2 communicates with the computer 4. For example, a computer manufacturer can input the ID numbers of all sold computers 2 into the database 7, for example, for purposes of future customer service. In the embodiments described hereinafter, however, the database stores and registers the computer 2 connected to the computer 4 through the registration procedure.

Although the computer 4 is connected to the computer 2, it is contemplated that the database 4 is configured to register any computer that communicates with the computer 4 and includes an identification module 8. As soon as the computer 2, or any additional computer, is registered, the computer 4 can identify and authorize the computer 2 during subsequent communications.

Further, the computer 2 can include an optional encoding module 10. The encoding module 10 can encrypt, encode, hash or scramble the ID number so that the ID number cannot be directly accessed. Furthermore, the same ID number can be encoded, hashed or scrambled in different manners with different client modules.

Besides the hardware components illustrated in FIG. 1, it is contemplated that each computer 2, 4 has appropriate application and communications software modules. The software modules include, for example, Internet access software, cable modem software, two-way communications software, point-to-point software, the hasher software, software to retrieve and process the ID number from the identification module 8, and the like.

The communications modules, for example, allows communications between the computers 2, 4 in accordance with preferable standardized communications protocols. In one typical application, the communications protocols support the exchange of emails. These communications protocols include a Transmission Control Protocol/Internet Protocol (TCP/IP), a Simple Mail Transfer Protocol (SMTP), a File Transfer protocol (FTP), a Hypertext Transfer Protocol (HTTP) and a Lightweight Directory Access Protocol (LDAP).

The TCP/IP is a protocol that specifies how computers exchange data over the Internet, The TCP/IP handles tasks such as packetization, packet addressing, handshaking and error correction. The SMTP is used to transfer email between computers. Generally, the SMTP is a server-to-server protocol, so other protocols are used to access the messages. The SMTP dialog usually happens in the background under the control of a message transport system. The FTP is a client-server protocol that allows a user on one computer to transfer files to and from another computer over a TCP/IP network. The ITTP is a client-server TCP/IP protocol used on the World-Wide Web for the exchange of HTML documents. The LDAP is a relatively simple protocol for updating and searching directories running over TCP/IP, as described below in greater detail.

In addition, the communications modules can support H.323, the standard for conferencing over the Internet and within Internet, H.245, the control standard for multimedia communications as well as a wide variety of communication standards such as H.261, H.263 and the like. Furthermore, the communication modules can support a wide range of networking standards such as Ethernet, frame relay, integrated digital services network (ISDN), ISDN digital subscriber network, T1 carrier system, E1, E2, E3, E4 and E5 carriers, digital subscriber lines, cable networking protocols, fiber-distributed data interface, synchronous digital hierarchy, and the like.

Computers can communicate with each other, for example, over the Internet, because each computer can be addressed individually. In such embodiments, certain computers have an assigned Internet protocol address (IP address). The IP address is a 32-bit host address that is usually represented in dotted decimal notation, for example, 128.121.4.5. The decimal IP address is in most cases not known to the user. In addition, most users are not aware that this IP address exists. In addition, in many embodiments, a computer user has an assigned email address that specifies the source or destination of the message. The email address is typically in the form of "name@xyz.com", for example, as known in the art.

In accordance with one embodiment of the present invention, the ID number serves to address, identify and authorize computers. As mentioned above, the ID number is unique to a computer and cannot be altered. This provides a higher degree of reliability and security, because the IP address and the email address can be altered. For instance, some users alter the email address or the address field to camouflage the return address and, thus, their real identity.

Returning to the embodiment illustrated in FIG. 1. The user of the computer 2 writes an email to be sent to the user of the computer 4. When the email is composed and the user initiates transmission to the computer 4 over the communications medium 6, the communications software (e.g., SMTP) automatically converts the email into an appropriate electronic data format. Besides the actual email message, the return email address and the return IP address, the data format includes, in accordance with the present invention, the microprocessor-specific ID number.

The computer 4 receives the electronic representation of the email and converts it back to a user-readable message. During the process of converting, the computer 4 extracts the received ID number and compares (looks-up) it with the ID number(s) stored in the data base 7. When the received ID number matches one of the stored ID numbers, the computer 4 accepts the email as one received from an authorized computer.

The look-up of the ID number is generally triggered by an event. That is, when the computer 4 receives the email message, the look-up procedure starts. It is contemplated that the user of the computer 4 can define the specifics of the event-triggered look-up. For instance, the user can define if a notification of the requested look-up shall occur or if a recording or display of the look-up is desired.

The user of the computer 4 can define how emails from computers whose ID numbers are not stored in the database need to be treated. Depending on user-specified settings of the computer 4, emails from unauthorized/unidentified computers can be, for example, blocked or rejected. For instance, the user can create a contact list in which all authorized users are listed. If the received ID number does not match to the ID number stored for an authorized user from the contact list, the email will be rejected.

These settings, for example, prevent the user from receiving undesired emails from individuals who frequently change their email address or camouflage the return address. These undesired emails cannot be blocked by conventional filters which can be defined in email applications because the filters are typically only sensitive to the field "From:" for the return address.

In addition, the settings prevent the user from receiving unsolicited emails from Internet marketing companies or so-called "spammers." A "spammer" is an individual user or a service which post irrelevant or inappropriate messages to one or more users, send large amounts of unsolicited emails meant to promote a product or service, or intend to crash a program by overrunning a fixed-size buffer with excessively large input data.

Moreover, the computer 4 cannot only block or reject emails from unauthorized users, but also identify if the return email address that appears in the field "From:" is indeed the real email address. For example, the sender of the email could pretend to be an authorized user by changing the email address to one the sender believes the computer 4 accepts. However, because the ID number is included to the received email, the false identity of the sender of the email can be recognized.

Sending an e-mail from one user to another user is only one example of how the users can communicate with each other. Generally, the users of the computers 2, 4 can establish conferencing connections to communicate with each other. The conferencing connections can include video conferences, voice (audio) connections, chat connections, and data connections. It is contemplated that the various types of .conferencing connections can be combined so that, for example, a data connection is parallel to a voice connection.

Figure 2:
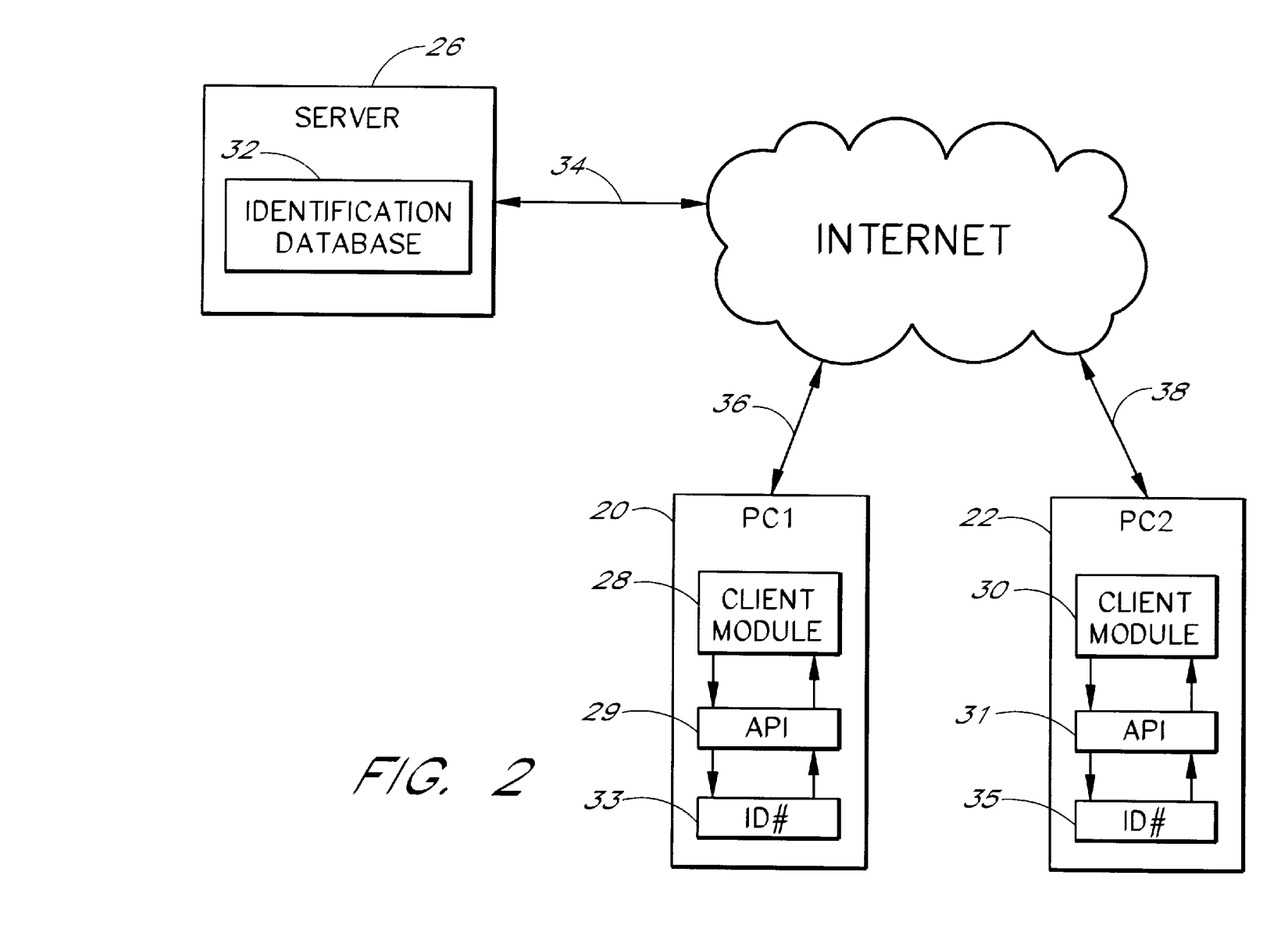
FIG. 2 shows a block diagram of a further embodiment of a computer network.

FIG. 2 shows a block diagram of a further embodiment of a computer network. The illustrated computer network includes (personal) computers 20, 22 and a server 26 which have access to the Internet, generally labeled with reference numeral 24. The server 26 and the computers 20, 22 are usually located at different remote locations. Individual users operate the computers 20, 22 that are similar to the computer 2 shown in FIG. 1 and described above. In one embodiment, the computers 20, 22 include client software modules 28, 30 ("client modules"), an application programming interface (APD modules 29, 31, and identification modules 33, 35. The modules are illustrated as individual modules within the computers 20, 22. However, those skilled in the art will appreciate that each of the modules are optional and can be distributed within the computers 20, 22 and perform various functions as described below.

The server 26 and the computers 20, 22 can connect to the Internet 24 by use of communications links 34, 36, 38, respectively. It is contemplated that a plurality of servers 26 and computers 20, 22 can connect to and access the Internet 24.

In the illustrated embodiment, the Internet 24 and the communications links 34, 36, 38 form the communications medium for the server 26 and the computers 20, 22. In addition, the communications medium may also encompass Internet access/service providers. Examples of Internet access/service providers include America Online, the Microsoft Network, Prodigy, CompuServe, and Network Intensive to name a few. Many users pay monthly access fees to the Internet access/service providers because the Internet providers provide local telephone connections, a variety of services and an organized format for accessing the Internet 24.

The Internet access/service providers are optional, and in some cases, the computers 20, 22 may have direct access to the Internet 24. For example, the computers 20, 22 may be connected to a local area network that in turn is directly connected to the Internet 24. It should be understood that the local area network may also connect to the Internet 24 via a conventional telephone line; however, since local area networks typically have a higher volume of data traffic, it is advantageous to include a high-speed connection to support the volume of the information which the local area network will transfer to and from the Internet 24.

In one embodiment, the client modules 28, 30 interact with the API modules 29, 31. The client modules 28, 30 accesses the operating system and other services of the computer 20, 22 through the API modules 29, 31. The API modules 29, 31 are defined at source code level and provide a level of abstraction between the client module and other aspects of the computer system. In other embodiments, the client modules 28, 30 directly interact with the operating system or hardware components.

The API module 29, 31 can also provide an interface between a high level language and lower level utilities and services which were written without consideration for the calling conventions supported by compiled languages. In this case, the API module's 29, 31 main task may be the translation of parameter lists from one format to another and the interpretation of call-by-value and call-by-reference arguments in one or both directions.

For instance, the API modules 29, 31 receive requests "Get: ID number" from the client modules 28, 30 and retrieve tile ID numbers from the identification modules 33, 35 (processors) of the computers 20, 22, respectively. Then, the API modules 29, 31 forward the retrieved ID number to the client modules 20, 22 where the ID numbers are available for further processing within the computers 20, 22. The further processing includes, for example, creating a hashed or encoded version of the actual ID number.

Associated with the client modules 28, 30 and the API modules are so-called Software Development Kits (SDK). An SDK is generally the software module provided by a software vendor to allow their products to be used with those of other software vendors. In one client application, the SDK module directs the API module to retrieve the ID number. The SDK modules and the client modules 28, 30 allow the users to perform various applications such as look-ups in database and sales transactions as described below in greater detail. For example, the SDK modules register the computers 20, 22 with the server 26, and contact the server 26 when the computers 20, 22 access the Internet 24.

In one embodiment, the server 26 includes an identification database 32, which stores the ID numbers of the computers 20, 22 that are registered with the server 26. The server 26 is a computer that provides services for the computers 20, 22 and other computers connected to it via the Internet 24. As a general function, the server 26 services requests from the remote computers 20, 22 (clients) to read from and write to the identification database 32. The server 26 is also referred to as the "directory server."

The server 26 allows access to the identification database 32 by means of a database query language. With this language, users can (interactively) formulate requests and generate reports, A known example of a database query language is structured query language (SQL).

SQL is an industry-standard language for creating, updating and querying relational database management systems. In some applications, SQL is embedded in general purpose programming languages. SQL provides for a variety of functions to organize databases. To name a few functions: define and manipulate tables of data, generalize and specialize hierarchies, multiple inheritance, user defined data types, triggers and assertions, support for knowledge based systems, recursive query expressions, and additional data administration tools. SQL also includes the specification of abstract data types (ADTs), object identifiers, methods, inheritance, polymorphism, encapsulation, and all of the other facilities normally associated with object data management, The server 26 and the computers 20, 22 use a common protocol, for example, TCP/IP, to encode the requests from the computers 20, 22 and the responses of the server 26. The server 26 may run continuously (as a daemon), waiting for requests to arrive or it may be invoked by some higher level daemon which controls a number of specific servers. Examples of servers that are associated with the Internet 24 include those for Network File System, Network Information Service (NIS), Domain Name System (DNS), FTP, and Network Time Protocol.

In one embodiment, the server 26 is further configured to operate as a server in accordance with the Lightweight Directory Access Protocol (LDAP) in addition to TCP/IP. In another embodiment, the server 26 can be configured to operate in accordance with Recommendation H.225.0 defined by the International Telecommunication Union (ITU). The Recommendation is entitled "Call signalling protocols and media stream packetization for packet-based multimedia communication systems."

Referring to the server 26 applying LDAP, an entry into a LDAP directory is defined as a collection of attributes with a name, called a distinguished name (DN). The DN refers to the entry unambiguously. Each of the entry's attributes has a type and one or more values. The types are typically mnemonic strings, like "cn" for common name, or "mail" for e-mail address. The values depend on the type.

Generally, LDAP directory entries are arranged in a hierarchical structure that reflects political, geographic, and/or organizational boundaries. Entries representing countries appear at the top of the tree while other entries in the tree represent states or national organizations. Below them, there may be entries representing people, organizational units, printers, documents, or the like.

As mentioned above, the server 26 is referred to a directory server. An example of a directory server is a Netscape Directory Server available from Netscape, Inc. The Netscape Directory Server connects/hooks in one embodiment into Oracle8, a software module available from Oracle Inc. Briefly, Oracle8 includes a server software module configured for database applications, for example, online transaction processing (OLTP). The directory server implements a networkbased registry, enabling applications to share data such as users, groups, and preferences. The server supports millions of entries and fast searches, for example, hundreds of queries per second.

Figure 3:
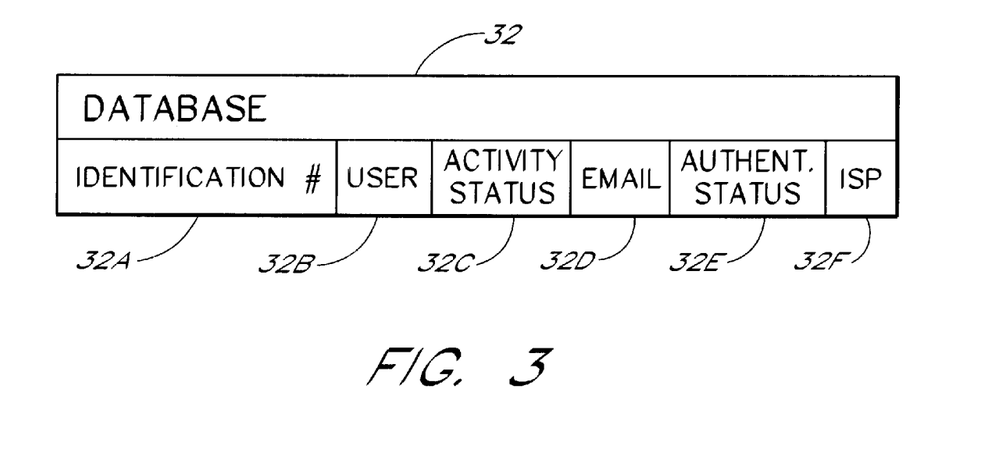
FIG. 3 shows an embodiment of a database structure.

FIG. 3 shows an exemplary data format as used in the identification database 32. The identification database 32 includes several fields 32A–32F of predetermined sizes. Each field 32A–32F includes an attribute. In the illustrated embodiment, the ID number is assigned to the field 32A which has a size of 44 bits. The user name and the email address are assigned to the fields 32B, 32D, respectively. The field 32B has a size of 128 bits and the field 32D has a size of 256 bits. The field 32C includes an attribute "activity status" and the field 32E includes an attribute "authentication statues." The field 32F includes an attribute "ISP" defining the Internet service provider. It is contemplated that the identification database 32 can include additional fields, such as for the IP address, geographical data and other user information.

In one embodiment, only the email address and the ID number are indexed. As is known in the art, an index is a sequence of (key pointer) pairs where each pointer points to a record in the database that contains the key value in a particular field. The index is sorted on the key values to allow rapid searching for a particular key value. In one embodiment, the index can be "inverted" in the sense that the key value is used to find the record rather than the other way round. For databases in which the records may be searched based on more than one field, multiple indices may be created that are sorted on those keys.

Figure 4:
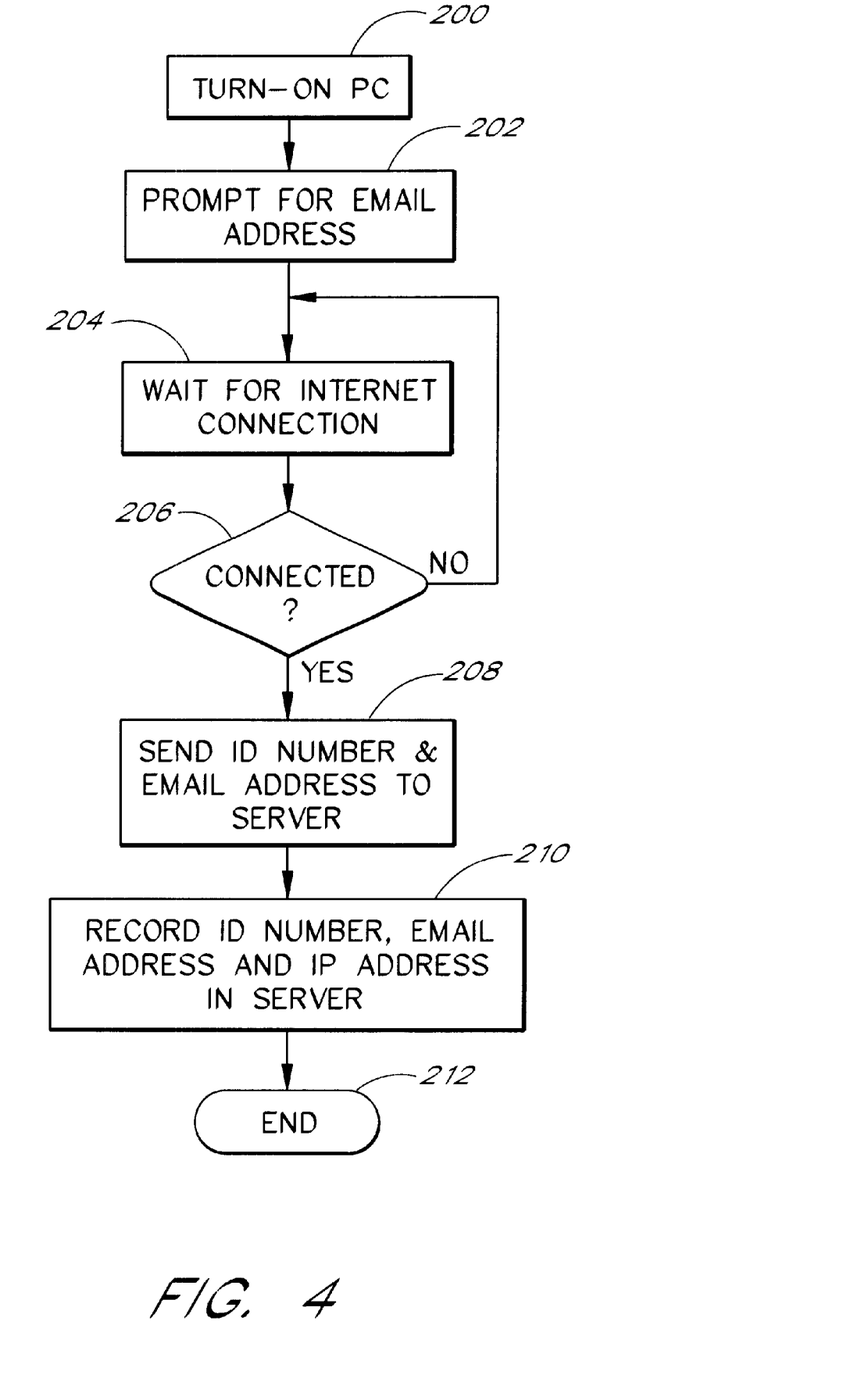
FIG. 4 shows a flow chart of a registration procedure.

When the client applications of the computers 20, 22 connect to the Internet 24, each computer 20, 22 has the option to register with the server 26. The registration of the computers 20, 22 is illustrated in FIG. 4 which shows a flow chart of one embodiment of a registration procedure.

The client module 28 prompts the user to input the email address. The user inputs the email address under which the user can receive emails. During a subroutine in state 202, the client module 28 retrieves the ID number from the processor and prepares a message to be sent to the server 26. The client module 28 includes as a default setting, the IP address of the server 26. In addition, the client module 28 may have a list of additional appropriate servers connected to the Internet 24.

Proceeding to state 204, the computer 20 waits, if not yet connected, until the user establishes a connection to the Internet 24, for example, by dialing the number of a Internet service provider. As indicated in state 206, the procedure returns along the NO branch to state 204 as long as the computer 20 waits for a connection to the Internet 24.

Upon connection to the, Internet service provider, the procedure proceeds along the YES branch to state 208. In state 208, the client module 28 (e.g., via SMTP) initiates that the prepared message is sent to the server 26. The message includes the ID number, the user's email address and the IP address. It is contemplated that additional information can be added depending on the data format used, as described below with reference to FIG. 5.

Proceeding to state 210, the server 26 records and organizes the information received with the message within the identification database 32. When this registration procedure is finished, the computer 20 is registered and the server 26 is ready for look-up, as indicated in state 212 and the procedure ends in state 214. The registration procedure registers the computer 20 with the server 26 for future verification by retrieving the ID number from the computer 20 and sending it to the server 26. At the end of the registration procedure, the ID number is stored in the server 26.

Under certain circumstances, for example, to provide for increased security against unauthorized access, the ID number can be modified within the computer 20. The computer 20 uses conventional authentication software which applies a hash function to the ID number. One example of such an authentication software is iGuard that uses iGuard Secured Agents. The iGuard software is available from Rainbow Technologies, Inc.

In one embodiment, the computer 20 applies a hash function to the ID number to convert it to a first hashed ID number. In one embodiment, first hashed ID number uses the ID number and a server-specific server identifier. The server 26 then stores the first hashed ID number.

Once the computer 20 is registered, the server 26 can authenticate the computer 20 during a connection. In one embodiment, the server 26 generates and sends a first random number to the computer 20 and requests a return message. In certain embodiments, the random number is called a session number. In addition, the server 26 sends a specific key to the computer 20. The specific key provides that a distinct authentication code is included in the return message from the computer 20.

The computer 20 applies the hash function to the first hashed number, the session number, the specific key, and a second random number to convert these numbers to a second hashed ID number. That is, the second hashed ID number is a function of the hashed number, the session number, the specific key and the second random number. The computer 20 generates the second random number so that the authentication code would be different even if the session number were a fixed value.

The server 26 receives the second hashed ID number and extracts the first hashed ID number. The server 26 retrieves lie stored first hashed ID number and compares it with the extracted first hashed ID number. If the hashed ID numbers match, the computer 20 is authenticated.

The user of the computer 22 can register with the server 26 in the same way as the user of the computer 20. The identification database 32 includes then the unique ID numbers of the computers 20, 22. If both computers 20, 22 apply hash flnctions to their ID numbers, the server 26 stores two first hashed ID numbers during the registration procedure. As the their ID numbers are different, the computers 20, 22 generate different first hashed ID numbers.

In one example, the users of the computers 20, 22 have both registered with the server 26 through the procedure illustrated in FIG. 4. In addition, the computers 20, 22 defined contact lists so that the computers 20, 22 accept only emails from authorized computers.

Figure 6:
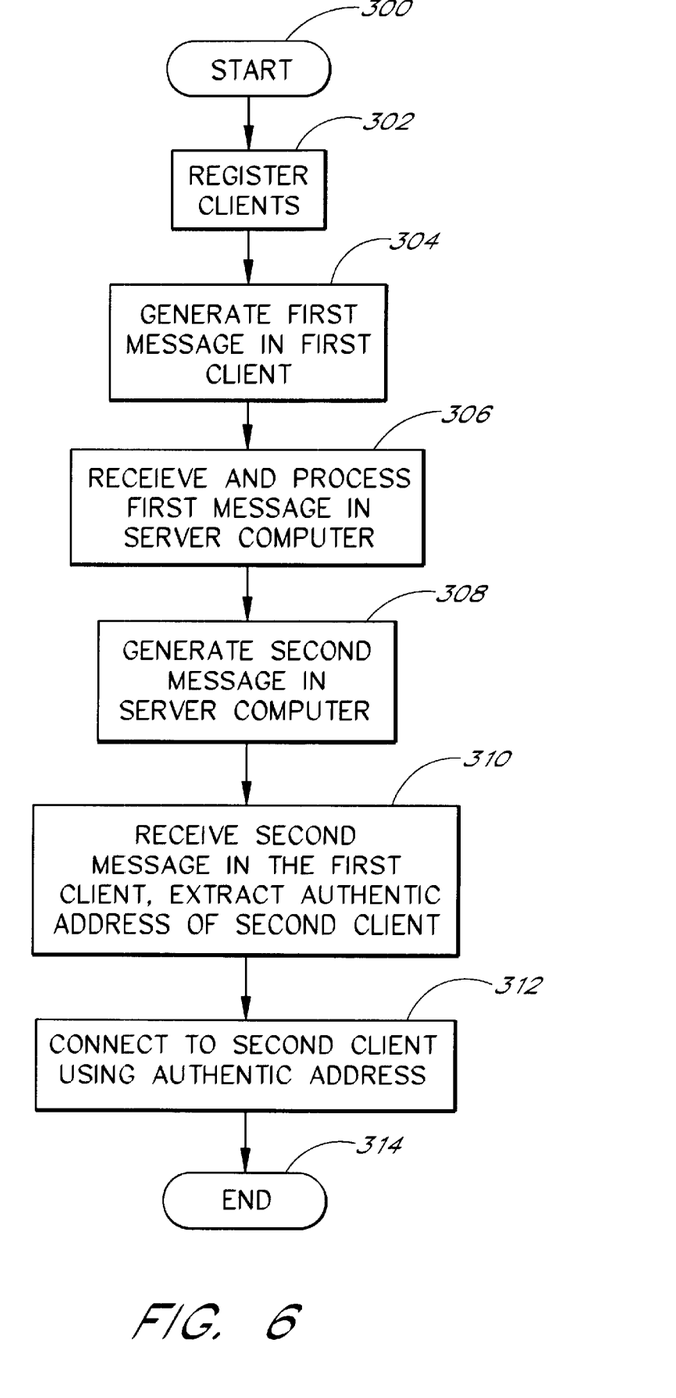
FIG. 6 shows a flow chart of a look-up procedure.

FIG. 6 is a flow chart illustrating a procedure for establishing an authenticated communication between the users of the computers 20, 22. The procedure is initialized in state 300. For illustrative purposes, the registration procedure shown FIG. 4 is represented in state 302 to indicate that a registration is optional before the authenticating procedure can be successful. In addition, as soon as the computers 20, 22 are online, the computers 20, 22 are registered as "active" within the server 26. This registration as "active" is in this embodiment considered as being part of the state 302.

For example, when the computer 20 is online, the server 26 receives an automatic message from the computer 20 and compares the content of the identification database 32 with the ID number received with the message. The server 26 registers the computer 20 as active when its ID number matches an ID number stored in the identification database 32. In the same manner, the computer 22 is registered as "artive" as soon as it is online, In one embodiment, the registration as "active" can be used to notify the contacts of the contact list, that the computer 20 is online. For instance, as soon as the computer 20 is online, the computer 22 receives a message and displays the active state of the computer 20 through a highlighted contact name, an icon, or the like.

Proceeding to state 304, the user of the computer 20, or any other registered computer, can request a look-up of an email address from the server 26. Here, the user requests a look-up of the email address of the user of the computer 22. The user of the computer 20 prepares a message (email) to the server requesting the look-up of the email address included in the message. The message is sent over the Internet 24 to the server 26.

Proceeding to state 306, the server 26 receives the message from the Internet 24 ad initiates processing the message. The processing includes starting a module to look-up the email address in the identification database 32. The subroutine uses known methods to access and retrieve data from a database. The subroutine extracts the look-up email from the received message and checks if the identification database 32 includes a matching entry.

Proceeding to state 308, the server 26 generates a second message that is a response to the first message received from the computer 20. If the look-up did not result in a matching address, the second message informs the user of the computer 20 that no matching entry has been found. If, however, the look-up was successful, the second message includes an authenticated email address, authenticated because the email address is correlated to the unique ID number. In addition, the second message can include data indicating, for example, if the computer 22 is currently registered as active, i.e., if the user of the computer 22 is online at the moment.

Proceeding to state 310, the computer 20 receives the second message and extracts the authenticated email address of the computer 22. As in a conventional email application, the user of the computer 20 can read the email upon receipt or at a later time.

Proceeding to state 312, the user of the computer 20 can directly communicate with the user of the computer 22 using the authentic email address. To communicate, the user of the computer 20 has several options. The user can send an email to the user of the computer 22 that will be recognized as coming from a known contact. Alternatively, the user can connect directly to the computer 22 to initiate an online conferencing connection, such as a chat connection, a video conference, or a voice connection, if the user of the computer 22 is currently online or available. The procedure ends at state 314.

The described look-up via email address is typically the only way for users to find one another. This makes the system a closed system and attractive to users who do not want their information published. In particular, the system provides improved security and confidentiality for transactions that involve financial or personal data.

Figure 5:
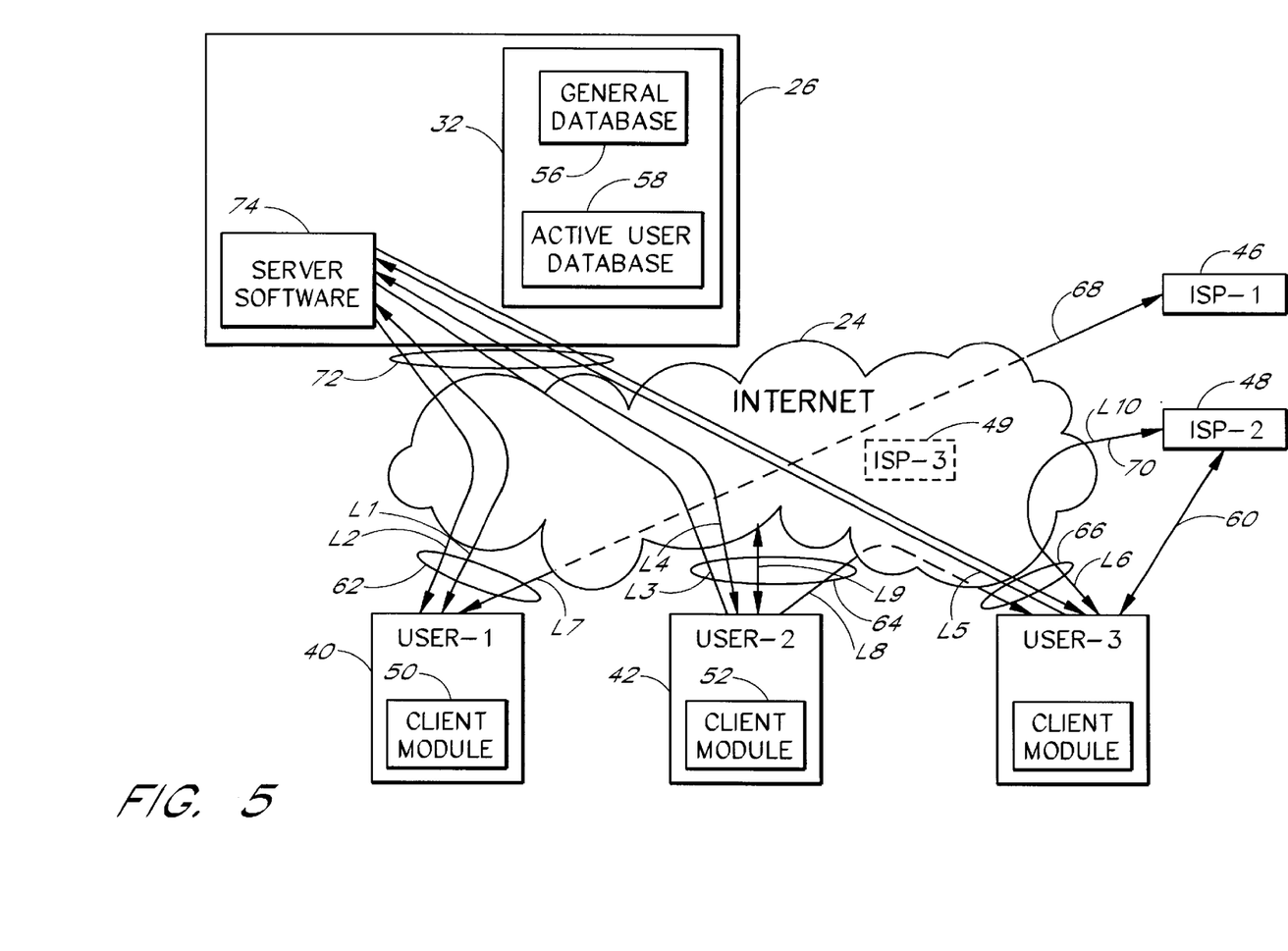
FIG. 5 shows a block diagram of a multiple user computer network.

FIG. 5 shows a further block diagram of a computer network. In the illustrated embodiment, the computer network comprises three computers 40, 42, 44, the server 26 and two service computers 46, 48 which are in the domain of two different Internet service providers. It is contemplated that a service computer can generally be interconnected within the Internet 24 and become part of the Internet 24. This is indicated through a service computer 49, located within the Internet 24 and shown with dashed lines for illustrative purposes. The Internet service providers are indicated in FIG. 5 as ISP-1 and ISP-2.

The server 26, the computers 40, 42, 44 and the service computers 46, 48 are connected to the Internet 24. The computers 40, 42, 44 are connected to the Internet 24 via communication links 62, 64, 66, respectively, and the server 26 is connected to the Internet 24 via a communications link 72. The service computers 46, 48 are connected to the Internet 24 via communications links 68, 70, respectively. In addition, the computer 44 has a direct communications link 60 to the service computer 48 of the ISP2.

The computers 40, 42, 44 include client modules 50, 52, 54, respectively, and are assigned to different users, indicated as USER-1, USER-2, USER-3. It is contemplated that the computers 40, 42, 44 are similar to the computers 20, 22 shown in FIG. 2 and described above, and that the client modules 50, 52, 54 perform similar functions as the client modules 28, 30 also shown in FIG. 2 and described above.

The server 26 includes a directory module 74 and the identification database 32. In the illustrated embodiment, the identification database 32 includes a general database 56 and a database 58 for storing the information of active users, i.e., users which are currently online. The server 26 can access and modify the identification database 32 in response to a request of a Internet service provider or a client, for example, from one of the computers 40, 42, 44.

In the illustrated embodiment, the users USER-1, USER-2, USER-3 want to access the Internet 24 and the Internet service providers ISP-1, ISP-2 and perform secured transactions. For this example, it is assumed that the ID numbers of the computers 40, 48 are stored in the identification database 32.

As soon as the user USER-1 is online, the client module 50 API (SDK) automatically sends a message to the server 26, as indicated through a connection line L1. The message includes the ID number. The message may also include, but is not limited to, the IP address and email address as described above. The directory module 74 receives and processes the message and initiates an update of the identification database 32. The user USER-1 is then stored as an active user.

If the user USER-i wants to communicate with the Internet service provider ISP-1, the user USER-1 requests a look-up of the email address of the Internet service provider ISP-1. The server 26 executes this look-up request and generates a response if the requested email address matches one of the stored and authenticated email addresses. The generated response includes the IP address of the Internet service provider ISP-1. The response sent to the user USER-1 is indicated through a connection line L2. Using the IP address, the user USER-1 can then directly connect to the Internet service provider ISP-1.

Similarly, the client modules 52, 54 of users USER-2, USER-3 register as active users when accessing the Internet 24. Regarding the user USER-2, the register and look-up procedure is indicated through connection lines L3, L4, and regarding the user USER-3, the register and look-up procedure is indicated through connection lines L5, L6.

If the user USER-2 requests a look-up of the email address of the user USER-3, the response includes the IP address of the computer 44 of the user USER-3. The user USER-2 can then directly connect to the user USER-3 to send an email, to chat, to have a video conference, or the like. The connection between the computers 42, 44 is indicated as connection line L8.

It is contemplated that the user USER-2 can look-up a variety of email addresses. A general connection with a computer connected to the Internet 24 is indicated through a connection line L9. Correspondingly, the user USER-3 can connect to the Internet service provider ISP-2 via the Internet 24, as indicated through a connection line L1. Alternatively, the computer 22 and the service computer can be connected through the communications link 60, as described above.

Figure 7:
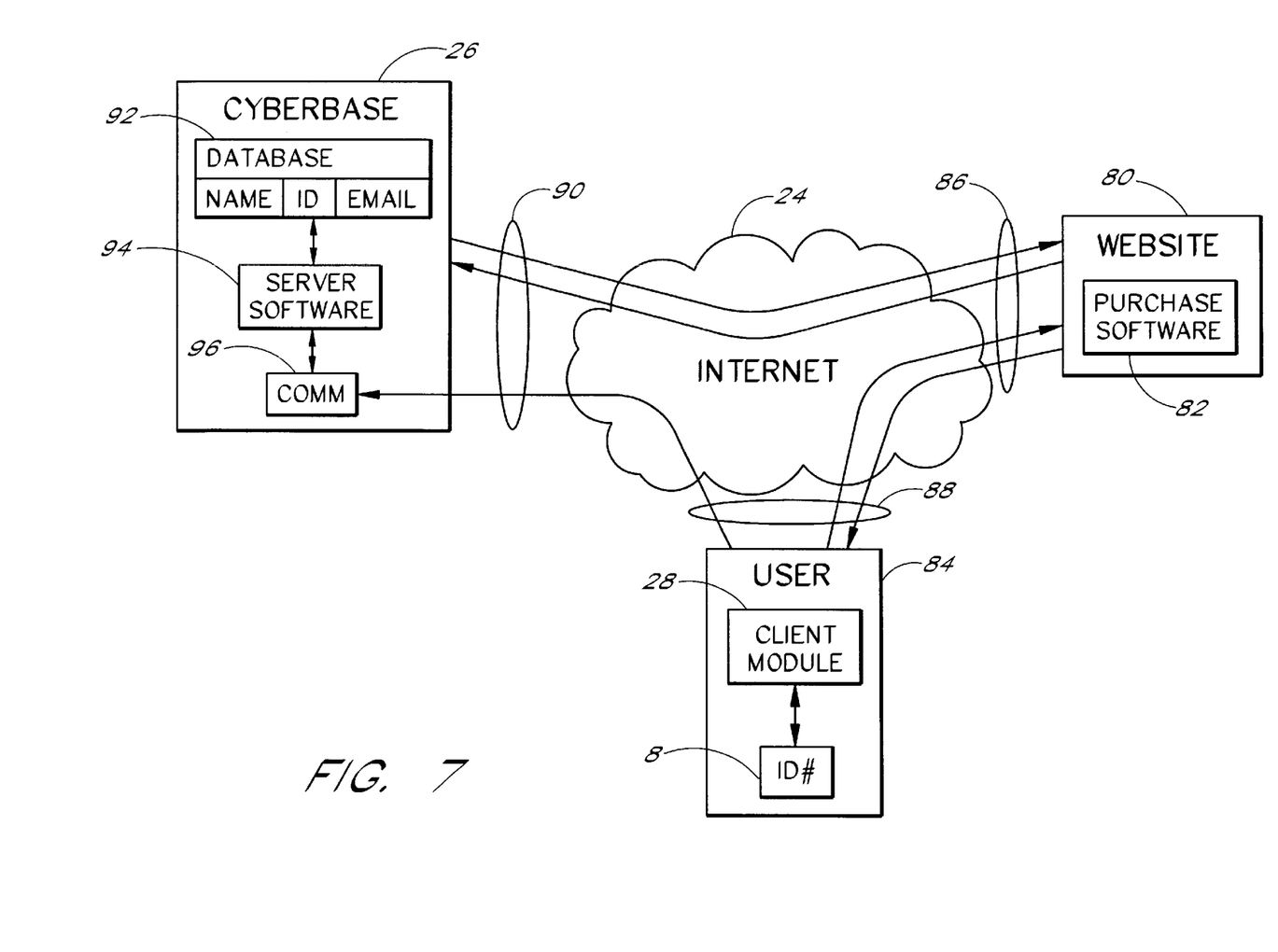
FIG. 7 shows a block diagram of further embodiment of a computer network.

FIG. 7 shows a further block diagram of a computer network. In the illustrated embodiment, the computer network comprises a client computer 84, the server 26 and a web computer 80. The web computer 80 can be in the domain of an Internet service provider and provides for a website, for example, for an Internet shop. The web computer 80 includes a software module 82 running interactive purchase software. As in the previous drawing, it is contemplated that the web computer 80 can generally be interconnected within the Internet 24 and become part of the Internet 24.

The server 26 and the computers 80, 84 are connected to the Internet 24 which provides for the communications medium. The client computer 84, is connected to the Internet 24 via a communication link 88, and the server 26 is connected to the Internet 24 via a communications link 90. The web computer 80 is connected to the Internet 24 via a communication link 86.

The client computer 84 includes the client module 28 and is assigned to a user interested in purchasing products over the Internet. Similar to the previous drawings (FIG. 1), the client computer 84 includes the identification module 8. It is contemplated that the computers 80, 84 are generally similar to the computers 40–48 shown in FIG. 2 and described above, and that the client module 28 performs similar functions as the client modules 28, 30, also shown in FIG. 2 and described above.

FIG. 4 illustrates an example for electronic commerce in which the Internet shop (web computer 80) offers goods and services over the Internet 24 and the user of the client computer 84 intends to order goods from the Internet shop.

In this example, the web computer 80 and the client computer 84 have registered with the server 26 according to the registration procedure illustrated in FIG. 4. Using a communications link Cl, the user of the client computer 84 requests a look-up of the email address of the Internet shop. The server 26 performs the look-up in its database 92 and returns an authenticated email address if the look-up email address matches to an entry correlated to the ID number in the database 92.

The user of the client computer 84 can then establish a direct communications link C2 with the web computer 80 using the authenticated email address. This assures the user of the client computer 84 that the communication occurs directly with the Internet shop when the user places an order with the Internet shop. In some cases, the Internet shop requires that the order include consumer-specific data such as name, address and the number of the credit card.

Before the Internet shop confirms the order via a communications link C3, the Internet shop can request a look-up of the client's email address to ensure that the data of the order is correct. The look-up request and the resulting response occur via communications links C4, C5, respectively.

As described above, the ID numbers are unique within the identification database 32 as well as within the Internet 24. In contrast, user names and email addresses, for example, can appear more than once within continuously growing global Internet. Because of this, there may be two users that claim to have the same email address. If such a collision occurs on a lookup, both users will be returned from the query. The identification database 32 permits users to look up other users only by email address and not by the ID number. However, the index to the ID number is there, because the contact list may need to look up a specific ID number.

While certain preferred embodiments of the invention have been described, these embodiments have been presented by way of example only, and are not intended to limit the scope of the present invention. Accordingly, the breadth and scope of the present invention should be defined only in accordance with the following claims and their equivalents.

What is claimed is:

1. A method of maintaining a user identification database that indicates when users are in communication with a network, the method comprising the acts of:

associating in a computer accessible storage medium electronic mail addresses, processor-embedded identifiers and status information;

receiving a first electronic message from a first computer, the first electronic message containing an electronic mail address and a copy of the processor embedded identifier existing in the first computer;

using the first electronic mail address to access the corresponding processor-embedded identifier stored in the storage medium;

comparing the processor-embedded identifier from the first computer with the processor-embedded identifiers of the storage medium;

modifying the status information in the storage medium to indicate that the first electronic mail address is authentic when the processor-embedded identifier from the first computer matches a processor-embedded identifier of storage medium;

receiving a second electronic message from a second computer, the second electronic message requesting authentication of the first electronic mail address;

comparing the first electronic mail address with the electronic mail addresses stored in the storage medium; and sending a third message to the second computer that indicates whether the first electronic mail address is authentic.

2. The method of claim 1, further comprising the acts of:

obtaining the status information that corresponds to the first electronic mail address; and including the status information to the third message.

3. The method of claim 1, further comprising the act of using the authenticated first electronic mail address to establish a communications link between the first and second computers.

4. The method of claim 1, wherein the act of modifying the status information includes indicating the first computer as active.

5. The method of claim 1, wherein the act of receiving the second electronic mail includes indicating the second computer as active in the storage medium.

6. The method of claim; 1, wherein the act of associating electronic mail addresses includes registering the first and second computers in a computer accessible database.

7. The method of claim 6, wherein the act of registering includes storing each processor-embedded identifier in the database together with the electronic mail address of the registering computer.

8. The method of claim 1, further comprising the act of altering the processor-embodded identifier in the first computer.

9. The method of claim 8, wherein the act of altering includes encoding the processor-embedded identifier.

10. The method of claim 8, wherein the act of altering includes hashing the processor-embedded identifier.

11. The method of claim 1, further comprising the act of using the communications link to initiate sending an order from the first computer to the second computer as part of a sales transaction.

* * * * *